(12) United States Patent
Dodds et al.

(10) Patent No.: US 9,933,544 B2
(45) Date of Patent: Apr. 3, 2018

(54) NEAR-BIT GAMMA RAY SENSORS IN A ROTATING SECTION OF A ROTARY STEERABLE SYSTEM

(71) Applicant: Halliburton Energy Services, Inc., Houston, TX (US)

(72) Inventors: Lauren Jane Dodds, Edmonton (CA); Jonathan Peter Zacharko, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/526,997

(22) PCT Filed: Dec. 24, 2014

(86) PCT No.: PCT/US2014/072325
§ 371 (c)(1),
(2) Date: May 15, 2017

(87) PCT Pub. No.: WO2016/105406
PCT Pub. Date: Jun. 30, 2016

(65) Prior Publication Data
US 2017/0329042 A1    Nov. 16, 2017

(51) Int. Cl.
*G01V 5/12*    (2006.01)
*E21B 47/01*    (2012.01)
(Continued)

(52) U.S. Cl.
CPC ............ *G01V 5/12* (2013.01); *E21B 47/01* (2013.01); *G01V 5/04* (2013.01); *G01V 5/101* (2013.01); *E21B 47/00* (2013.01)

(58) Field of Classification Search
CPC .. G01V 5/12; G01V 5/04; E21B 47/00; E21B 47/01; E21B 47/02
See application file for complete search history.

(56) References Cited

U.S. PATENT DOCUMENTS

| 4,698,501 A | 10/1987 | Paske |
| 5,017,778 A | 5/1991 | Wraight |

(Continued)

FOREIGN PATENT DOCUMENTS

| EP | 0806542 A2 | 11/1997 |
| EP | 1995406 A1 | 11/2008 |
| EP | 1169656 B1 | 4/2014 |

OTHER PUBLICATIONS

International Search Report and Written Opinion issued in related PCT Application No. PCT/US2014/072325 dated Aug. 31, 2015, 17 pages.

(Continued)

*Primary Examiner* — David Porta
*Assistant Examiner* — Faye Boosalis
(74) *Attorney, Agent, or Firm* — Alan Bryson; Baker Botts L.L.P.

(57) ABSTRACT

An example apparatus includes an outer housing and a drive shaft at least partially within and rotationally independent from the outer housing. A drill bit may be coupled to the drive shaft. At least one gamma ray sensor may be rotationally coupled to the drive shaft within the outer housing. In certain embodiments, the apparatus further includes a housing rotationally coupled to the drive shaft, wherein the housing comprises at least one pressurized cavity; and the at least one gamma ray sensor is located within the at least one pressurized cavity.

20 Claims, 4 Drawing Sheets

(51) Int. Cl.
    *G01V 5/04*          (2006.01)
    *G01V 5/10*          (2006.01)
    *E21B 47/00*        (2012.01)

(56) References Cited

U.S. PATENT DOCUMENTS

| | | |
|---|---|---|
| 6,109,372 A | 8/2000 | Dorel et al. |
| 6,272,434 B1 | 8/2001 | Wisler et al. |
| 6,446,736 B1 | 9/2002 | Kruspe et al. |
| 6,637,524 B2 | 10/2003 | Kruspe et al. |
| 7,083,006 B2 | 8/2006 | Kruspe et al. |
| 7,950,473 B2 | 5/2011 | Sugiura |
| 8,421,004 B2 | 4/2013 | Molz et al. |
| 8,455,812 B2 | 6/2013 | Nikitin et al. |
| 8,579,044 B2 | 11/2013 | Allen et al. |
| 2006/0266555 A1 | 11/2006 | Chen et al. |
| 2007/0107937 A1 | 5/2007 | Sugiura |
| 2008/0164025 A1 | 7/2008 | Peter |
| 2009/0071645 A1 | 3/2009 | Kenison et al. |
| 2010/0286916 A1 | 11/2010 | Wang |
| 2011/0120775 A1 | 5/2011 | Krueger et al. |

OTHER PUBLICATIONS

International Preliminary Report on Patentability issued in related Application No. PCT/US2014/072325, dated Jul. 6, 2017 (13 pages).

NEAR-BIT GAMMA RAY SENSORS IN A ROTATING SECTION OF A ROTARY STEERABLE SYSTEM

CROSS-REFERENCE TO RELATED APPLICATION

The present application is a U.S. National Stage Application of International Application No. PCT/US2014/072325 filed Dec. 24, 2014, which is incorporated herein by reference in its entirety for all purposes.

BACKGROUND

The present disclosure relates generally to well drilling operations and, more particularly, to near-bit gamma ray sensors in a rotating section of a rotary steerable system.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Drilling a wellbore may include introducing a drill bit into formation and rotating the drill bit with a drill string. In certain operations, a rotary steerable system (RSS) may be and used to precisely locate the drill bit—both vertically and horizontally—in the formation by altering an axis of the drill bit with respect to the wellbore. A point-the-bit system generally refers to an RSS in which an axis of the drill bit is altered with respect to the axis of the RSS. A push-the-bit system generally refers to an RSS in which hydraulic or other fluid-controlled pistons extend from the RSS and contact the wall of the borehole.

Drilling a wellbore may also include collecting of measurements of the subterranean formation that may guide the drilling operation. Example measurements include, but are not limited to, resistivity, gamma ray, sonic, nuclear magnetic resonance, and seismic measurements. For steering applications, collecting measurements at or near the drill bit may facilitate quicker and more accurate drilling decisions. Generating measurements at or near the drill bit may be problematic, however, depending on the configuration of the RSS, which may be coupled to or located directly above the drill bit.

FIGURES

Some specific exemplary embodiments of the disclosure may be understood by referring, in part, to the following description and the accompanying drawings.

Figure 1:
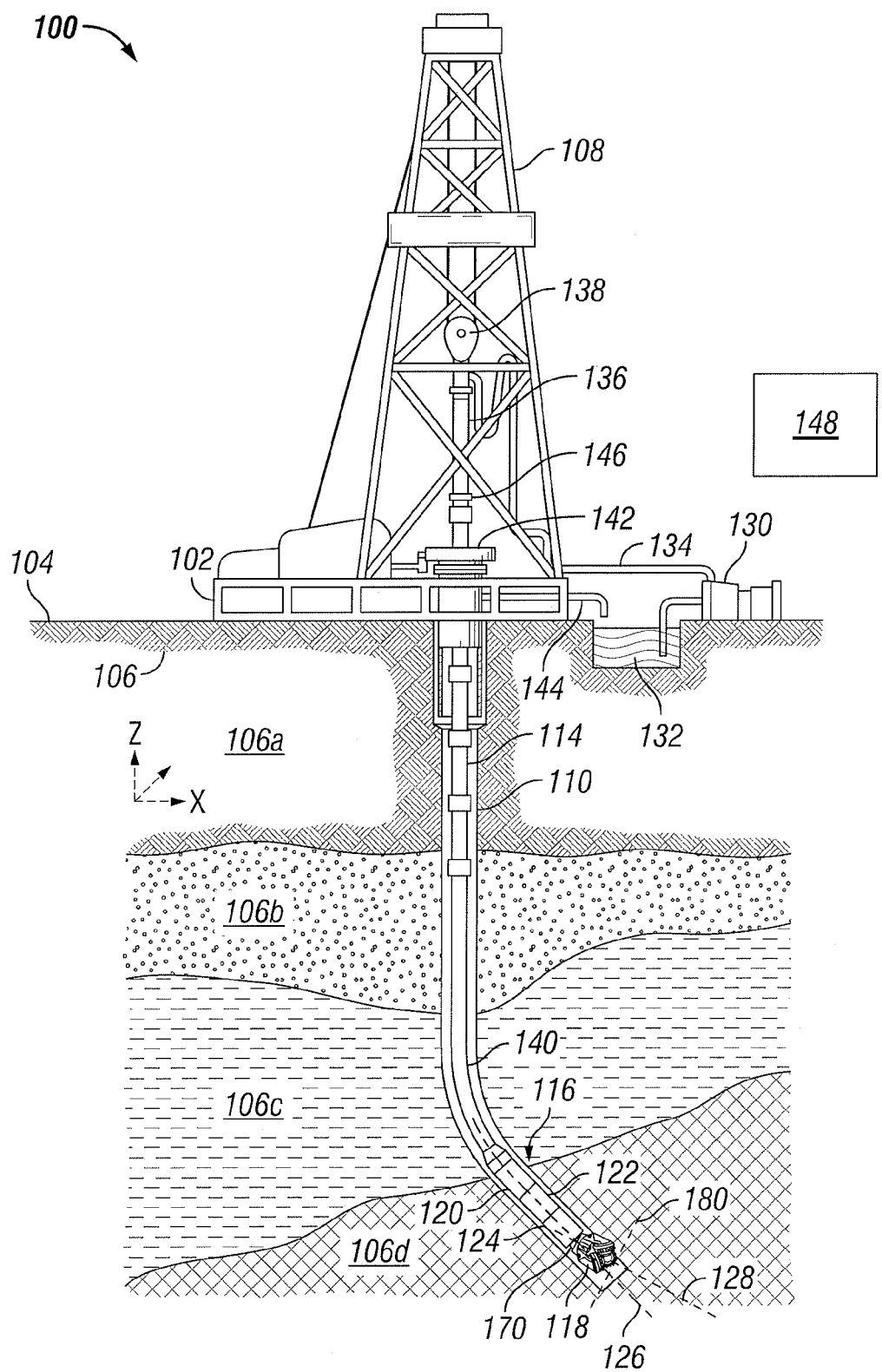
FIG. 1 is a diagram illustrating an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The disclosed embodiments are provided by way of example only, and are not exhaustive of the scope of the disclosure.

DETAILED DESCRIPTION

The present disclosure relates generally to well drilling operations and, more particularly, to near-bit gamma ray sensors in a rotating section of a rotary steerable system.

In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

Certain systems and methods are discussed below in the context of petroleum drilling and production operations in which information is acquired relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The terms "couple" or "couples" as used herein may involve either a direct or indirect connection. For example, two mechanically coupled devices may be directly mechanically coupled when the mechanical coupling involves close or direct physical contact between the two devices, or indirectly mechanically coupled when the two devices are each coupled to an intermediate component or structure. The term "communicatively coupled" as used herein generally refers to an electronic (or, in some cases, fluid) connection via which two elements may electronically (or fluidically) communicate. An electronic coupling typically enables electrical power and/or data flow between elements. Such an electronic connection may involve a wired and/or wireless connection, for example, using Wifi, Bluetooth, or other wireless protocol, LAN, co-axial wiring, fiber-optic wiring, hard-wired physical connections, circuit board traces, or any other electronic signal medium or combinations thereof. As with direct and indirect physical connections, a first device may be directly communicatively coupled to a second device, such as through a direct electronic connection, or indirectly communicatively coupled, via intermediate devices and/or connections.

FIG. 1 is a diagram of a subterranean drilling system 100 including an example RSS 124, according to aspects of the present disclosure. The drilling system 100 comprises a drilling platform 102 positioned at the surface 104. In the embodiment shown, the surface 104 comprises the top of a formation 106 containing one or more rock strata or layers 106a-d, and the drilling platform 102 may be in contact with the surface 104. In other embodiments, such as in an off-shore drilling operation, the surface 104 may be separated from the drilling platform 102 by a volume of water.

The drilling system 100 comprises a derrick 108 supported by the drilling platform 102 and having a traveling block 138 for raising and lowering a drill string 114. A kelly 136 may support the drill string 114 as it is lowered through a rotary table 142 into a borehole 110. A pump 130 may circulate drilling fluid through a feed pipe 134 to kelly 136, downhole through the interior of drill string 114, through orifices in a drill bit 118, back to the surface via an annulus 140 formed by the drill string 114 and the wall of the borehole 110. Once at the surface, the drilling fluid may exit the annulus 140 through a pipe 144 and into a retention pit 132. The drilling fluid transports cuttings from the borehole 110 into the pit 132 and aids in maintaining integrity or the borehole 110.

The drilling system 100 may comprise a bottom hole assembly (BHA) 116 coupled to the drill string 114 near the drill bit 118. The BHA 116 may comprise a LWD/MWD tool 122 and a telemetry element 120. The LWD/MWD tool 122 may include receivers and/or transmitters (e.g., antennas capable of receiving and/or transmitting one or more electromagnetic signals). As the borehole 110 is extended by drilling through the formations 106, the LWD/MWD tool 122 may collect measurements relating to various formation properties as well as the tool orientation and position and various other drilling conditions.

The telemetry sub 120 may transfer measurements from the BHA 116 to a surface receiver 146 and/or receive commands from the surface receiver 146. The measurements may comprise measurements from the LWD/MWD tool 122 and/or from the RSS 124, as will be described below. The telemetry sub 120 may transmit measurements or data through one or more wired or wireless communications channels (e.g., wired pipe or electromagnetic propagation). Alternatively, the telemetry sub 120 may transmit data as a series of pressure pulses or modulations within a flow of drilling fluid (e.g., mud-pulse or mud-siren telemetry), or as a series of acoustic pulses that propagate to the surface through a medium, such as the drill string 114. Commands received at the telemetry sub 120 may be transmitted to the elements of the BHA 116 to which the commands are directed.

In certain embodiments, the drilling system 100 may comprise an information handling system 148 positioned at the surface 104. The information handling system 148 may be communicably coupled to the surface receiver 146 and may receive measurements from the BHA 116 and/or transmit commands to BHA 116 though the surface receiver 146. The information handling system 148 may also receive measurements from the elements of the BHA 116 when they are retrieved at the surface 102. In certain embodiments, the information handling system 148 may process the measurements to determine certain characteristics of the formation 106, and may transmit commands one or more elements of the BHA 116 that are based, at least in part on the determined formation characteristics.

The drill bit 118 may be driven by a downhole motor (not shown) and/or rotation of the drill string 114 to drill the borehole 110 in the formation 106. In certain embodiments, the downhole motor (not shown) may be incorporated into the BHA 116 directly above the drill bit 118 and may rotate the drill bit 118 using power provided by the flow of drilling fluid through the drill string 114. In embodiments where the drill bit 118 is driven by the rotation of the drill string 114, the rotary table 142 may impart torque and rotation to the drill string 114, which is then transmitted to the drill bit 118 by the drill string 114 and elements in the BHA 116.

In certain embodiments, the BHA 116 may further comprise a steering assembly, such as the RSS 124. The RSS 124 may be coupled to the drill bit 118 and may control the drilling direction of the drilling system 100 by controlling at least one of the angle of longitudinal axis 126 of the RSS 124 with respect to axis the borehole 110 and the angle of longitudinal axis 128 of the drill bit 118 with respect to the RSS 124. Altering one or both of those angles may offset a tool face 180 of the drill bit 118 such that it is non-parallel with the bottom of the borehole 110, thereby causing the drilling assembly to further drill the borehole with a directional offset relative to the immediately preceding portion of the borehole. In certain embodiments, the RSS 124 may alter the drilling direction of the drilling system 100 in response to commands transmitted by the information handling system 148.

In the embodiment shown, the RSS 124 comprises a point-the-bit system in which an internal drive shaft (not shown) of the RSS 124 rotates to drive the drill bit and is deflected to angle of longitudinal axis 128 of the drill bit 118 with respect to the RSS 124. According to aspects of the present disclosure, at least one gamma ray sensor (not shown) may be rotationally coupled to the drive shaft to generate gamma ray measurements of the formation 106 at or near the drill bit 118. As will be described in detail below, the at least one gamma ray sensor may generate measurements both while rotating with the internal drive shaft and while at rest, providing a broad range of measurements from which steering decisions can be made. Those measurements may be received at the information handling system 148, either via transmission through the telemetry sub 120 and surface receiver 146 or when the RSS 124 is retrieved at the surface, and processed to guide steering decisions.

Figure 2:
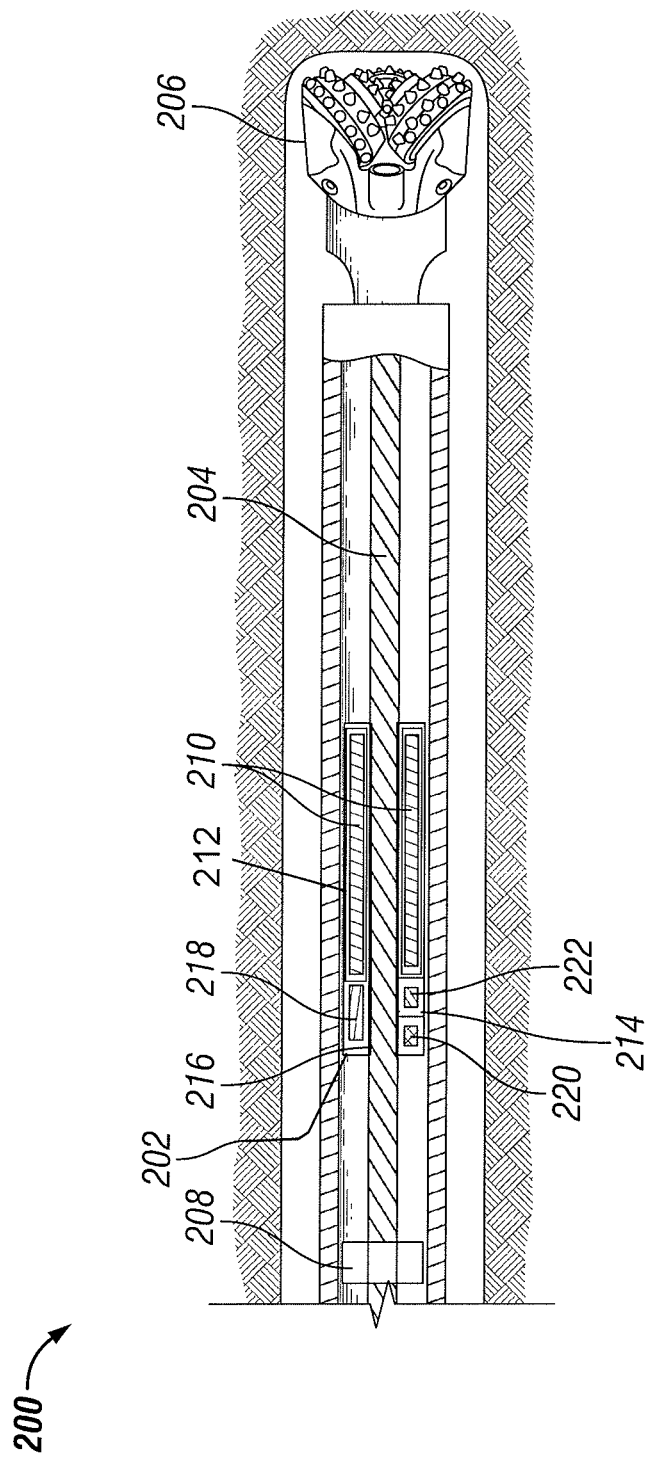
FIG. 2 is a diagram of a portion of an example RSS, according to aspects of the present disclosure.

FIG. 2 is a diagram of a portion of an example RSS 200, according to aspects of the present disclosure. In the embodiment shown, the RSS 200 comprises an outer housing 202 and a drive shaft 204 at least partially within and rotationally independent from the outer housing 202. The drive shaft 204 may be coupled to a drill bit 206 at one end and to a torque source (not shown) at the other end. Example torque sources include a downhole motor and a drill string rotated form the surface by a top drive. During drilling operations, the torque source may rotate the drive shaft 204, which in turn rotates the drill bit 206 and causes the drill bit 206 to bore into a formation, while the outer housing 202 may remain generally non-rotating. In the embodiment shown, the longitudinal axis of the drill bit 206 may be altered using a deflection assembly 208, such as eccentric rings, coupled to the outer housing 202 to radially deflect the drive shaft 204 within the housing 202 during operation.

According to aspects of the present disclosure, the RSS 200 may comprise at least one gamma ray sensor 210 rotationally coupled to the drive shaft 204 within the outer housing 202. The at least one gamma ray sensor 210 may comprise any gamma ray sensor type typically used for downhole measurements, as would be appreciated by one of ordinary skill in the art in view of this disclosure. Example sensors include one or more Geiger-Müller tubes, and a photosensor matrix scintillating crystal with one or more optical sensors such as a photo multiplier tube, photocell, PIN diode, photodiode or a quantum dot graphene based photon sensor.

In the embodiment shown, the at least one gamma ray sensor 210 comprises a plurality of gamma ray sensors located within at least one pressurized cavity 212 in a housing 214. The at least one pressurized cavity 212 may be maintained at an atmospheric pressure to ensure proper functionality of the sensor 210. In certain embodiments, the plurality of gamma ray sensors 210 may be spaced at equal angular intervals around the housing 214, or bunched together to provide measurements with improved directional sensitivity. Additionally, the plurality of gamma ray sensors 210 may be located within a plurality of pressurized cavities spaced at equal angular intervals around the housing 214, as will be described in detail below.

In the embodiment shown, the sensors 210 are longitudinally parallel with the outer housing 202 and comprise the same length. As would be appreciated by one of ordinary skill in the art in view of this disclosure, the sensitivity of a gamma ray sensor may positivity correlate with its size. Accordingly, length of the sensors 210 and the housing 214/pressure cavity 212 to accommodate the sensors 210 may be scaled based on the measurement sensitivity required and the physical constraints of the RSS 200. In other embodiments, the lengths of the sensors 210 may be non-uniform and/or the sensors 210 may be oriented differently within the housing 214.

The housing 214 may be rotationally coupled to the drive shaft 204 such that the housing 212 and the gamma ray sensors 210 rotate with the same speed and direction as the drive shaft 204. In the embodiment shown, the housing 214 is rotationally coupled to the drive shaft 204 via a series of longitudinal splines 216 formed on the outer surface of the drive shaft 204 and the inner surface of the housing 214. The use of the housing 214 and splines 216 to rotationally couple the gamma ray sensors 210 to the drive shaft 204 is not intended to be limiting, as other mechanisms may be used.

In the embodiment shown, the sensors 210 and housing 212 are located on the drill bit side of the deflection assembly 208 to allow the sensors 210 to be positioned closer to the drill bit 206. This may improve the accuracy of the resulting measurements and the speed with which resulting steering decisions may be made. In other embodiments, the sensors 210 may be located at other positions along the drive shaft 204, including on the opposite side of the deflection assembly 208 from the drill bit 206.

The housing 210 may further include electronics associated with the sensors 210. The electronics may include at least one of a control unit 218, a power source 220, and a position sensor 222. The power source 220 may comprise, for example, a battery pack or a capacitor bank. In other embodiments, the power source 220 may be located outside of the housing 214 and power may be provided to the housing through one or more electrical couplings (not shown), such as an inductive coupling between the housing 214 and the outer housing 202. The position sensor 222 may comprise, for example, an accelerometer, a magnetometer, or any other sensor that can be used to identify the rotational position of the housing 214 within a borehole, as would be appreciated by one of ordinary skill in the art in view of this disclosure. In certain embodiments, the position sensor 222 may draw as a reference the rotational position of the outer housing 202, which may remain substantially non-rotating during use.

The control unit 218 may be coupled to the power source 220, position sensor 222, and gamma ray sensors 210. The control unit 218 may draw power from the power source 220 and receive measurements from both the position sensor 222 and the gamma ray sensors 210, and may process the measurements received from the gamma ray sensors 210 using the measurement received from the position sensor 222, as will be described below. The control unit 218 may include a processor, examples of which include microprocessors, microcontrollers, digital signal processors (DSP), application specific integrated circuit (ASIC), or any other digital or analog circuitry configured to interpret and/or execute program instructions and/or process data. The control unit 218 may further comprise a memory element communicably coupled to the processor. The processor may be configured to interpret and/or execute program instructions and/or data stored in memory. Example memory elements comprise non-transitory computer readable media that may include any system, device, or apparatus configured to hold and/or house one or more memory modules; for example, memory may include read-only memory, random access memory, solid state memory, or disk-based memory. Each memory module may include any system, device or apparatus configured to retain program instructions and/or data for a period of time (e.g., computer-readable non-transitory media).

Figure 3:
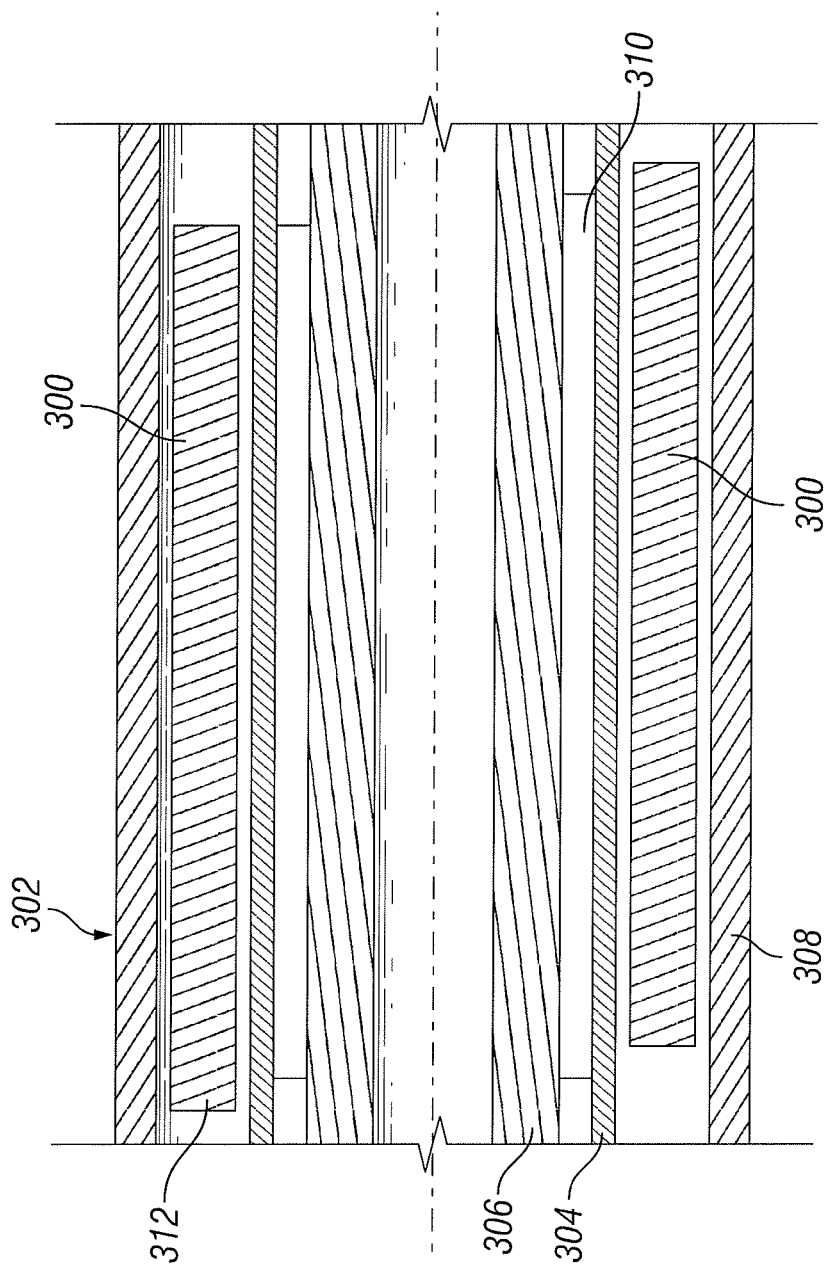
FIG. 3 is a diagram of example gamma ray sensors within a housing, according to aspects of the present disclosure.

FIG. 3 is a diagram of example gamma ray sensors 300 within a housing 302, according to aspects of the present disclosure. In the embodiment shown, the housing 302 comprises an inner sleeve 304 rotationally coupled to a drive shaft 306 of a RSS, and an outer sleeve 308 rotationally coupled to the inner sleeve 304. The inner sleeve 304 may be rotationally coupled to the drive shaft 306 through a plurality of splines 310 formed on an inner surface of the inner sleeve 304 and an outer surface of the drive shaft 306. The outer sleeve 308 may be rotationally coupled to the inner sleeve 304 through brackets (not shown) or any other attachment mechanism that would be appreciated by one of ordinary skill in the art in view of this disclosure. The inner sleeve 304 and the outer sleeve 308 may at least partially define at least one pressure cavity 312 in which the gamma ray sensors 300 are located. In other embodiments, the at least one pressure cavity 312 may comprise a plurality of pressure cavities defined, in part, by features of the inner housing 304 and/or the outer housing 308, in which the plurality of gamma ray sensors 300 are angularly spaced.

Figure 4:
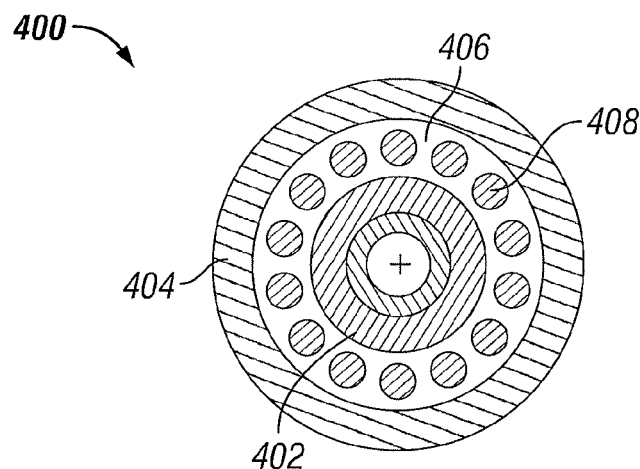
FIG. 4 is a diagram of an example housing comprising an inner sleeve and an outer sleeve, according to aspects of the present disclosure.

FIG. 4 is a diagram of an example housing 400 comprising an inner sleeve 402 and an outer sleeve 404, according to aspects of the present disclosure. In the embodiment shown, the inner sleeve 402 and outer sleeve 404 both have circular cross-sections and cooperate to at least partially define a single, annular pressure cavity 406 in which the plurality of gamma ray sensors 408 are angularly spaced. The angular spacing may comprise a uniform angular interval, as shown. In other embodiments, the angular spacing may be non-uniform, for example, with sensors 408 grouped together at a first angular interval, and the groups of the sensors 406 spaced around the housing 400 at a second angular interval.

Figure 5:
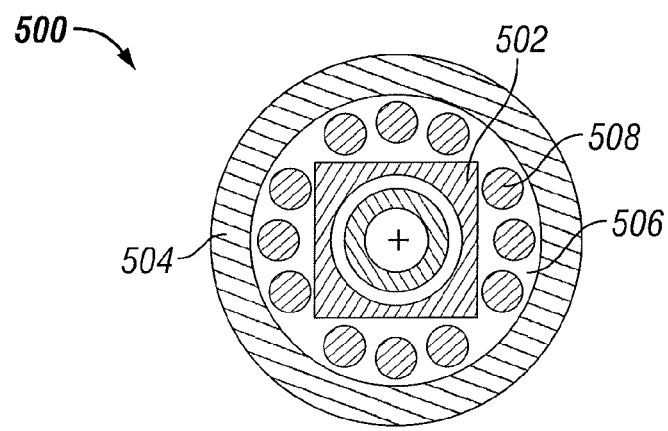
FIG. 5 is a diagram of another example housing comprising an inner sleeve and an outer sleeve, according to aspects of the present disclosure.

FIG. 5 is a diagram of another example housing 500 comprising an inner sleeve 502 and an outer sleeve 504, according to aspects of the present disclosure. In the embodiment shown, the inner sleeve 502 comprises a square cross-section and the outer sleeve 504 comprises a circular cross-section. The inner sleeve 502 and outer sleeve 504 still cooperate to form a single pressure cavity 506, but the cavity comprises a non-uniform shape due to the square cross-section of the inner sleeve 502. Due to the non-uniform shape of the pressure cavity 506, the gamma ray sensors 508 may be separated into groups spaced around the housing 500. The spacing of the groups and the spacing of the sensors 508 within the groups may provide an improved directional resolution to measurements generated by the sensors 508.

Figure 6:
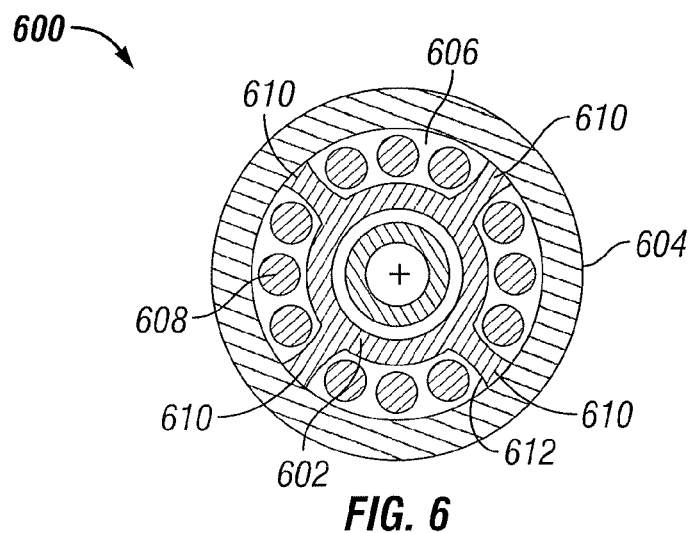
FIG. 6 is a diagram of another example housing comprising an inner sleeve and an outer sleeve, according to aspects of the present disclosure.

FIG. 6 is a diagram of another example housing 600 comprising an inner sleeve 602 and an outer sleeve 604, according to aspects of the present disclosure. In the embodiment shown, the inner sleeve 602 comprises a plurality of ribs 610 extending radially outward from the center of the inner sleeve 602. The ribs 610 may be positioned at equal angular intervals around the inner sleeve 602, or with any other angular spacing. In certain embodiments, the ribs 610 may contact and seal against the outer sleeve 604 to form a plurality of pressure cavities within the housing 600. In other embodiments, as shown, the ribs 610 may not seal against the outer sleeve 604, instead forming a plurality of pockets within a single pressure cavity 608.

Like the housing described with reference to FIG. 5, the non-uniform spacing of the sensors 608 caused by the presence of the ribs 610 may provide an improved directional resolution to measurements generated by the sensors 608. In certain embodiments, the inner sleeve 604 may comprise a gamma ray shielding or absorbing material 612 to focus the angular sensitivity and directionality of the sensors 608. In the embodiment shown, the gamma ray shielding or absorbing material 612 is deposited in a thin layer on the outer surface of the inner sleeve 602 such that the angular sensitivity of each group of sensors 608 is focused outwards, away from the gamma ray shielding or absorbing material 612. Example gamma ray shielding or absorbing materials include materials with a high electron/mass density, such as lead, that can be deposited in a thin layer without significantly reduce the clearance for the sensors within the housing, and Graded-Z shielding, a laminate composed of a gradient of high to low density materials. Similar gamma ray shielding may be used with any of the embodiments described herein, including applying the gamma ray shielding to any of the inner and/or outer sleeve configurations described herein. Additionally, the gamma ray shielding may be applied in short angular segments on the inner and/or outer sleeve to increase the angular sensitivity of the resulting measurements.

Although the embodiments of the housing described above include different cross sections and features on the inner sleeve to facilitate angularly focused measurements by the gamma ray sensors, it is also possible that such cross-sections and features may be located the outer sleeve. For example, the ribs 610 in FIG. 6 may be formed on an inner surface of the outer sleeve 604, rather than on an outer surface of the inner sleeve 602. Additionally, separate elements, such as separately formed ribs, may be inserted between the inner and outer sleeves.

When in use, a RSS similar to the ones described above may be located within a subterranean formation, where measurements may be taken by the gamma ray sensors. The measurements may be taken, for example, when the gamma ray sensors are rotating with the drive shaft, or when the drive shaft is temporarily halted and the gamma ray sensors are stationary. Those measurements may be received at a control unit associated with the gamma ray sensors along with position information, and processed and/or collected by the control unit and transmitted to a surface information handling system through a telemetry system coupled to the RSS. The surface information handling system may determine one or more formation characteristics based, at least in part, on the received measurements. Example formation characteristics include the type of rock in the formation immediately surrounding a drill bit coupled to the RSS, which may be used to determine where formation boundaries are and how to steer the drill bit. In other embodiments, the measurements may be transmitted to a separate control unit within the RSS that may determine one or more formation characteristics based, at least in part, on the received measurements and make automatic steering decisions based, at least in part, on the determined formation characteristic.

In certain embodiments, the measurements generated by the gamma ray sensors may comprise bulk gamma ray measurements. Bulk gamma ray measurements may be generated while the gamma ray sensors are rotating or non-rotating with the drive shaft. Each gamma ray sensor may sense gamma rays emitted by the formation in all angular orientations with respect to the drive shaft. The resulting measurements from each of the plurality of gamma ray sensors may be aggregated to identify a total or average gamma ray measurement for a particular depth of the formation. The total or average gamma ray measurement may be used to identify trends in radiation level at the RSS, which may indicate a change in the composition of the formation near the drill bit such that drilling needs to be halted or the drilling direction altered. Additionally, it may indicate the need to take directional measurements, described below, to determine if the increasing radiation level is attributable to all of the formation at that depth range or to a radiation source located in a particular angular orientation with respect to the RSS, which may be the case, for example, when the drill bit is near a formation boundary.

In certain embodiments, directional measurements may be taken with the gamma ray sensors both while the gamma ray sensors are rotating with the drive shaft and while the gamma ray sensors are temporarily halted. When temporarily halted, the measurements from the gamma ray sensors may be correlated with position sensor data to identify the angular orientation around the drive shaft that corresponds to the gamma ray measurements. The angular orientations may be divided into "bins" that each correspond to a range of angular orientations with respect to the drive shaft. The size of the bins/range of angular orientation may be arbitrary or may depend, in part, on the directionality of the gamma ray sensors coupled to the drive shaft. For example, each bin may comprise a 90° quadrant surrounding the RSS, corresponding to the configuration of FIG. 6 in which the gamma ray sensors are divided into four equally space pockets around the housing. Other bin sizes are possible, including non-uniform bin. Similar binning techniques may be used when the gamma ray sensors are rotating. In those instances, however, the delay time between when a gamma ray is transmitted and received, and the rotational speed of the gamma ray sensor may skew the correspondence between the angular orientation in which the gamma ray was emitted and the angular orientation of the gamma ray sensors when the gamma ray was detected. Accordingly, the angular orientation of the gamma ray measurements may be corrected before they are associated with a particular bin.

According to aspects of the present disclosure, an example apparatus includes an outer housing and a drive shaft at least partially within and rotationally independent from the outer housing. A drill bit may be coupled to the drive shaft. At least one gamma ray sensor may be rotationally coupled to the drive shaft within the outer housing. In certain embodiments, the apparatus further includes a housing rotationally coupled to the drive shaft, wherein the housing comprises at least one pressurized cavity; and the at least one gamma ray sensor is located within the at least one pressurized cavity.

In certain embodiments, the housing comprises an inner sleeve rotationally coupled to the drive shaft and an outer sleeve rotationally coupled to the inner sleeve; and the inner sleeve and outer sleeve at least partially define the at least one pressure cavity. In certain embodiments, the inner sleeve comprises at least one of a circular and a square cross section. In certain embodiments, the inner sleeve and the outer sleeve at least partially define a plurality of pressure cavities angularly spaced around the housing.

In any of the embodiments described in the preceding two paragraphs, at least one of the inner sleeve and the outer sleeve may comprise a gamma shielding material. In any of the embodiments described in the preceding two paragraphs, the housing may be rotationally coupled to the drive shaft through splines. In any of the embodiments described in the preceding two paragraphs, the at least one gamma ray sensor may comprise a plurality of gamma ray sensors angularly spaced within the housing and oriented in parallel with the longitudinal axis of the outer housing. In any of the embodiments described in the preceding two paragraphs, at least one of a control unit, a power source, and a position sensor associated with the at least one sensor may be coupled to the housing. In any of the embodiments described in the preceding two paragraphs, the at least one gamma ray sensor may comprise at least one of a Geiger-Müller tube and a scintillator crystal coupled to an optical sensor.

According to aspects of the present disclosure, an example method includes positioning a rotary steerable system (RSS) within a subterranean formation, wherein the rotary steerable system comprises a drive shaft at least partially within and rotationally independent from an outer housing. A measurement taken by at least one gamma ray sensor rotationally coupled to the drive shaft within the outer housing may be received, and a characteristic of the formation may be determined based, at least in part, on the received measurement. In certain embodiments, receiving the measurement taken by at least one gamma ray sensor rotationally coupled to the drive shaft within the outer housing comprises receiving measurements taken by a plurality of gamma ray sensors located within at least one pressurized cavity in a housing rotationally coupled to the drive shaft. In certain embodiments, the housing comprises an inner sleeve rotationally coupled to the drive shaft and an outer sleeve rotationally coupled to the inner sleeve; and the inner sleeve and outer sleeve at least partially define the at least one pressure cavity.

In any of the embodiments described in the preceding paragraph, receiving the measurement taken by at least one gamma ray sensor rotationally coupled to the drive shaft may comprise receiving the measurement taken by at least one gamma ray sensor while the drive shaft is rotating. In certain embodiments, the measurement comprises measurements taken by the at least one gamma ray sensor in all angular orientations with respect to the drive shaft. In certain embodiments, determining the characteristic of the formation based, at least in part, on the received measurement comprises determining a total or average measurement associated with a depth of the formation at which the measurement was taken. In certain embodiments, determining the characteristic of the formation based, at least in part, on the received measurement comprises dividing the measurements into a plurality of bins, each comprising a range of angular orientations surrounding the RSS. In certain embodiments, dividing the measurements into a plurality of bins, each comprising a range of angular orientations surrounding the RSS comprises correcting each measurement based, at least in part, on the rotating speed of the at least one gamma ray sensor.

In any of the embodiments described in the preceding two paragraphs, receiving the measurement taken by at least one gamma ray sensor rotationally coupled to the drive shaft may comprise receiving the measurement taken by at least one gamma ray sensor while the drive shaft is not rotating. In certain embodiments, determining the characteristic of the formation based, at least in part, on the received measurement comprises at least one of dividing the measurement into one of a plurality of bins, each comprising a range of angular orientations surrounding the RSS; and determining a total or average measurement associated with a depth of the formation at which the measurement was taken.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple" or "coupled" or any common variation as used in the detailed description or claims are not intended to be limited to a direct coupling. Rather two elements may be coupled indirectly and still be considered coupled within the scope of the detailed description and claims.

What is claimed is:

1. An apparatus, comprising:
   an outer housing;
   a drive shaft at least partially within and rotationally independent from the outer housing;
   a drill bit coupled to the drive shaft; and
   at least one gamma ray sensor rotationally coupled to the drive shaft within the outer housing, wherein the at least one gamma ray sensor senses gamma rays emitted by a formation in one or more angular orientations with respect to the drive shaft.

2. The apparatus of claim 1, further comprising a housing rotationally coupled to the drive shaft, wherein
   the housing comprises at least one pressurized cavity; and
   the at least one gamma ray sensor is located within the at least one pressurized cavity.

3. The apparatus of claim 2, wherein
   the housing comprises an inner sleeve rotationally coupled to the drive shaft and an outer sleeve rotationally coupled to the inner sleeve; and
   the inner sleeve and outer sleeve at least partially define the at least one pressure cavity.

4. The apparatus of claim 3, wherein the inner sleeve comprises at least one of a circular and a square cross section.

5. The apparatus of claim 3, wherein the inner sleeve and the outer sleeve at least partially define a plurality of pressure cavities angularly spaced around the housing.

6. The apparatus of claim 3, wherein at least one of the inner sleeve and the outer sleeve comprises a gamma shielding material.

7. The apparatus of claim 2, wherein the housing is rotationally coupled to the drive shaft through splines.

8. The apparatus of claim 2, wherein the at least one gamma ray sensor comprises a plurality of gamma ray sensors angularly spaced within the housing and oriented in parallel with the longitudinal axis of the outer housing.

9. The apparatus of claim 2, wherein at least one of a control unit, a power source, and a position sensor associated with the at least one sensor is coupled to the housing.

10. The apparatus of claim 2, wherein the at least one gamma ray sensor comprises at least one of a Geiger-Müller tube and a scintillator crystal coupled to an optical sensor.

11. A method, comprising:
    positioning a rotary steerable system (RSS) within a subterranean formation, wherein the rotary steerable system comprises a drive shaft at least partially within and rotationally independent from an outer housing;
    taking a measurement by at least one gamma ray sensor rotationally coupled to the drive shaft within the outer housing, wherein the at least one gamma ray sensor senses gamma rays emitted by a formation in one or more angular orientations with respect to the draft shaft;
    receiving the measurement taken by the at least one gamma ray sensor;
    determining a characteristic of the formation based, at least in part, on the received measurement.

12. The method of claim 11, wherein receiving the measurement taken by at least one gamma ray sensor rotationally coupled to the drive shaft within the outer housing comprises receiving measurements taken by a plurality of gamma ray sensors located within at least one pressurized cavity in a housing rotationally coupled to the drive shaft.

13. The method of claim 12, wherein
    the housing comprises an inner sleeve rotationally coupled to the drive shaft and an outer sleeve rotationally coupled to the inner sleeve; and
    the inner sleeve and outer sleeve at least partially define the at least one pressure cavity.

14. The method of claim 11, wherein receiving the measurement taken by at least one gamma ray sensor rotationally coupled to the drive shaft comprises receiving the measurement taken by at least one gamma ray sensor while the drive shaft is rotating.

15. The method of claim 14, wherein the measurement comprises measurements taken by the at least one gamma ray sensor in all angular orientations with respect to the drive shaft.

16. The method of claim 15, wherein determining the characteristic of the formation based, at least in part, on the received measurement comprises determining a total or average measurement associated with a depth of the formation at which the measurement was taken.

17. The method of claim 15, wherein determining the characteristic of the formation based, at least in part, on the received measurement comprises dividing the measurements into a plurality of bins, each comprising a range of angular orientations surrounding the RSS.

18. The method of claim 17, wherein dividing the measurements into a plurality of bins, each comprising a range of angular orientations surrounding the RSS comprises correcting each measurement based, at least in part, on the rotating speed of the at least one gamma ray sensor.

19. The method of claim 11, wherein receiving the measurement taken by at least one gamma ray sensor rotationally coupled to the drive shaft comprises receiving the measurement taken by at least one gamma ray sensor while the drive shaft is not rotating.

20. The method of claim 19, wherein determining the characteristic of the formation based, at least in part, on the received measurement comprises at least one of
   dividing the measurement into one of a plurality of bins, each comprising a range of angular orientations surrounding the RSS; and
   determining a total or average measurement associated with a depth of the formation at which the measurement was taken.

\* \* \* \* \*